United States Patent
Giacalone

(10) Patent No.: US 7,313,365 B2
(45) Date of Patent: Dec. 25, 2007

(54) MANAGEMENT OF DIGITAL WIRELESS CONNECTIONS

(75) Inventor: Joseph Giacalone, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 50 days.

(21) Appl. No.: 11/070,584

(22) Filed: Mar. 1, 2005

(65) Prior Publication Data

US 2006/0199582 A1 Sep. 7, 2006

(51) Int. Cl.
H04B 15/00 (2006.01)
H04B 17/00 (2006.01)
H04B 1/40 (2006.01)
H04M 3/42 (2006.01)
H04M 3/00 (2006.01)

(52) U.S. Cl. .............. 455/62; 455/77; 455/417; 455/419; 455/432; 455/432.1; 455/434; 455/435.2; 370/335; 370/337

(58) Field of Classification Search .......... 455/434, 455/552.1, 516, 518, 455, 435.3, 435.2, 515, 455/553, 62, 77, 417, 419, 432, 432.1
See application file for complete search history.

(56) References Cited

U.S. PATENT DOCUMENTS

| | | | | |
|---|---|---|---|---|
| 5,159,625 A | * | 10/1992 | Zicker | 455/432.1 |
| 5,442,806 A | * | 8/1995 | Barber et al. | 455/435.2 |
| 5,590,397 A | * | 12/1996 | Kojima | 455/417 |
| 5,613,213 A | * | 3/1997 | Naddell et al. | 455/435.2 |
| 5,761,618 A | * | 6/1998 | Lynch et al. | 455/419 |
| 5,841,853 A | | 11/1998 | Yamanishi et al. | |
| 5,903,832 A | * | 5/1999 | Seppanen et al. | 455/435.3 |
| 5,950,130 A | * | 9/1999 | Coursey | 455/432.1 |
| 5,983,115 A | * | 11/1999 | Mizikovsky | 455/512 |
| 6,011,960 A | * | 1/2000 | Yamada et al. | 455/77 |
| 6,011,978 A | | 1/2000 | Ault et al. | |
| 6,148,197 A | * | 11/2000 | Bridges et al. | 455/432.3 |
| 6,157,828 A | | 12/2000 | Krishnamurthi | |
| 6,157,835 A | * | 12/2000 | Findikli et al. | 455/436 |
| 6,201,964 B1 | * | 3/2001 | Tung et al. | 455/432.1 |
| 6,275,700 B1 | | 8/2001 | Takahashi | |
| 6,400,948 B1 | * | 6/2002 | Hardin | 455/434 |
| 6,430,396 B1 | * | 8/2002 | Bamburak et al. | 455/62 |
| 6,625,198 B1 | | 9/2003 | Tiedemann, Jr. et al. | |
| 6,625,451 B1 | * | 9/2003 | La Medica et al. | 455/434 |
| 6,738,617 B2 | | 5/2004 | Rosen et al. | |
| 6,785,249 B2 | * | 8/2004 | Soliman | 370/335 |
| 6,807,163 B1 | * | 10/2004 | Shi | 370/337 |
| 2002/0168976 A1 | * | 11/2002 | Krishnan | 455/432 |
| 2003/0148786 A1 | | 8/2003 | Cooper et al. | |
| 2004/0203907 A1 | * | 10/2004 | Hiller et al. | 455/456.1 |

* cited by examiner

Primary Examiner—William D. Cumming

(57) ABSTRACT

Systems and methods are provided for processing a digital only call origination request. When the digital call is released, a wireless communication device does not scan for a more preferred communication system, even if the wireless communication device has acquired a less preferred communication system. Instead, the device continues to be locked onto the current system. The device may wait until the expiration of a re-scan timer.

18 Claims, 4 Drawing Sheets

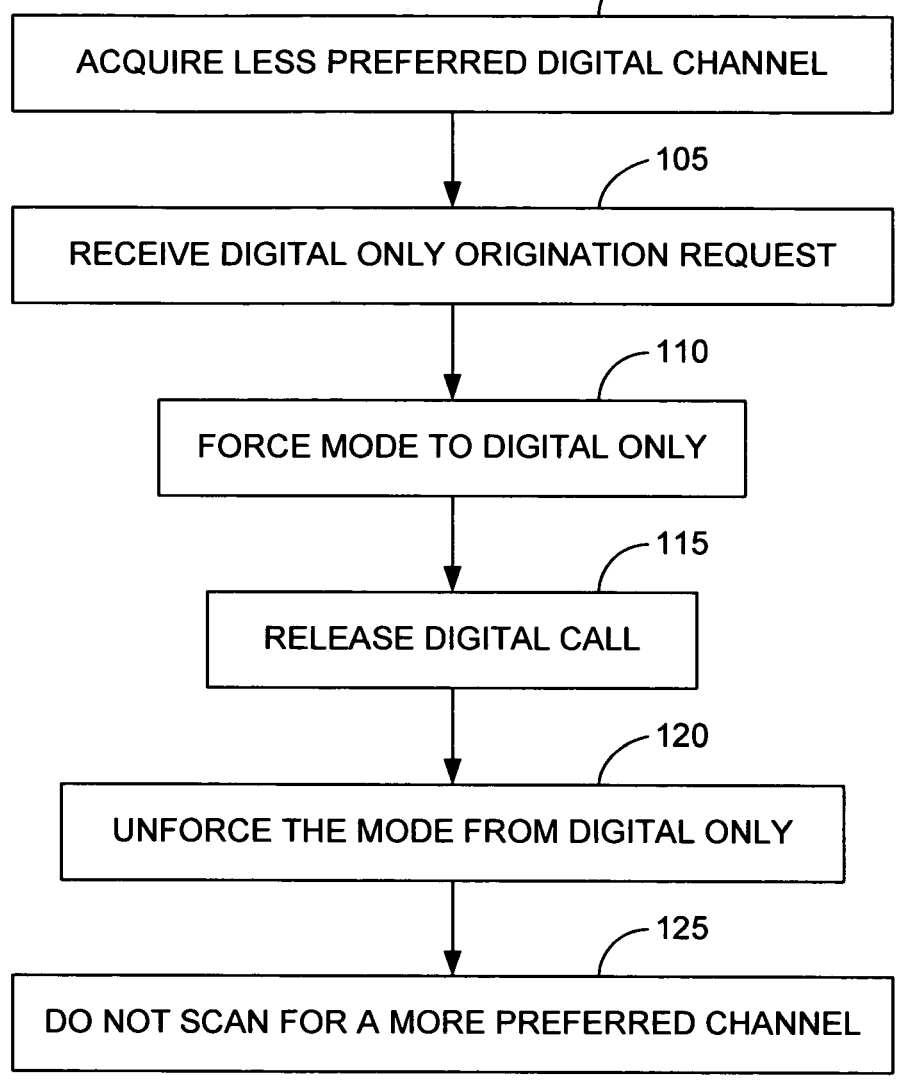
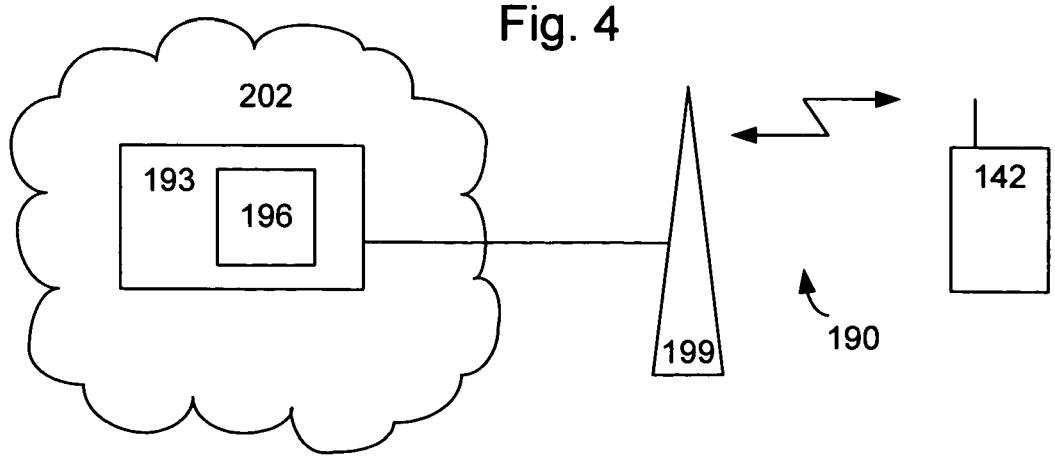

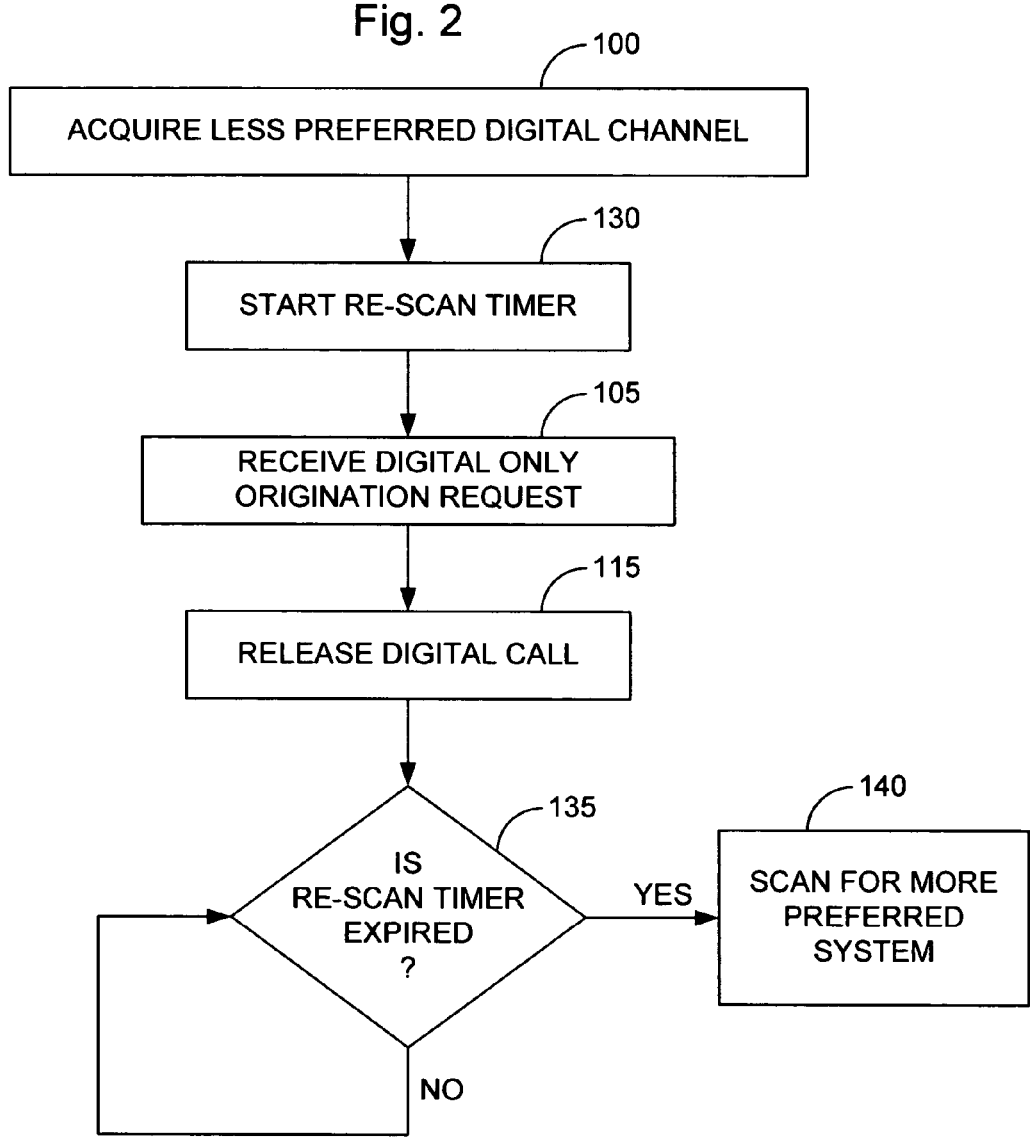

PRIOR ART

MANAGEMENT OF DIGITAL WIRELESS CONNECTIONS

BACKGROUND OF THE INVENTION

1. Field of the Invention

The invention relates generally to wireless communication and more particularly to systems and methods for digital call processing.

2. Background

Cellular wireless communication devices and networks are increasingly providing more and more services to users. Some services, such as two-way voice calls, can commonly be performed using either a digital or an analog network. Other services typically require a digital network, and cannot be performed with an analog network. One such service is push to talk (PTT) communications. In PTT communications, a user can instantly connect to another wireless communication device, instead of having to wait for the other device to ring and for the other user to answer the call. With a single push of a button the PTT call is connected.

PTT calls are commonly half duplex calls. Half duplex means that only one person can speak at a time. Unlike traditional full duplex calls, both parties cannot speak simultaneously. Of course, speech is not the only possible data carried on a PTT or traditional full duplex call. Speech is just considered here as the data for illustrative purposes. Other types of audio communication in addition to text and picture or video may also be possible.

To accomplish the instantaneous connection capability, a network must maintain presence information for each PTT enabled wireless communication device. For example, if A and B are users of PTT enabled wireless communication devices C and D, respectively, then the network must keep track of devices C and D so that C can connect instantly to device D. Additionally, A can cause his or her device C to be available for instant connection with device D or not to be available.

Not only does the network maintain information about the devices C and D, but each of the devices also commonly receives the information about the presence of other devices. For example, A can set the state of device C to receive PTT calls or not receive PTT calls. If device C is in a state of receiving PTT calls, and A wants to stop receiving PTT calls, A can select an option in the menu on his or her device C to stop receiving calls. Conversely, if device C is in a state of not receiving PTT calls, and A wants to start being available to receive PTT calls, A can select another option in the menu on his or her device C to start being available to receive PTT calls. To change states like this, the device C must send a message to the network indicating that the state is to be changed. The network must send a similar message to all devices such as device D that are configured to make PTT calls to device C. Such messages from the device changing state, such as device C, and to the other devices, such as device D, that need to know about the change of state are called presence messages.

PTT presence messages are typically sent on digital networks only. Thus, even though a wireless communication device might be configured to communicate on digital and analog networks, it may be necessary to restrict the device to digital networks only in order to send a presence message. Restricting the device to digital networks only is called restricting to digital mode only, or entering digital only mode.

After the PTT presence message is sent, the restriction to digital only mode can be removed so that the wireless communication device can again possibly communicate in either digital or analog mode.

Moving in and out of digital only mode is accomplished by using a preferred roaming list (PRL). A PRL is stored in the memory of the wireless communication device. The PRL contains records of all of the wireless communication systems or networks that the wireless communication device can communicate with. Several examples of using PRL's are described in U.S. Pat. No. 5,995,829, issued Nov. 30, 1999; U.S. Pat. No. 6,415,148 B1 (hereinafter, "the '148 patent"), issued Jul. 2, 2002; U.S. Pat. No. 6,466,802 B1 issued Oct. 15, 2002; U.S. patent application No. 2003/0134637 A1 published Jul. 17, 2003; U.S. patent application No. 2004/0110503, published Jun. 10, 2004; and U.S. patent application No. 2004/0121781 A1, published Jun. 24, 2004, which are each hereby incorporated in whole herein by reference.

As described in the '148 patent, the PRL typically contains a complete list of possible systems that the wireless communication device may encounter. The PRL contains preference information regarding each of the systems. Preference information means indications of which systems, networks and channels are preferred. Specifically, preference information may be information regarding system, network, channel, mode (e.g., digital or analog), geographical information. That is, preference information is any information on which a preference can be made by a wireless communication device. Preferences are selections based on preference information. For example, a wireless communication might be in a digital only mode. The digital only mode means that a preference is selected. Only those systems and networks having a digital indication in the preference information in the PRL can be used by the wireless communication device.

FIG. 5 is a flow chart illustrating a typical algorithm involving system acquisition. In step 500, the algorithm starts. The start step 500 may be powering up of the wireless communication device. In step 505, an ordered set of channels is derived from the PRL 510 and any preferences 515 (e.g., digital only). Specifically, an acquisition table 517 is contained in the PRL 510. The ordered set of channels is derived from the acquisition table 517, and is known as a scan list. In step 520 the ordered set of channels is sorted based on the most recent used list (MRU) 525. In step 530 the wireless communication device acquires a communication system. Once the communication system is acquired, the device knows its geographical location. In step 533, another set of ordered channels is derived based on any preferences 515 and the PRL 510. Specifically, system table geo information 536 is used to derive the set of ordered channels. The set of ordered channels derived this way is another scan list, which can be known as a rescan list.

Typically, subscribers, such as S1, subscribe to wireless communication services from a particular service provider, or network. For example, S1 may subscribe to service provider H1. S2 may also subscribe to service provider H1. Service provider H1 may have a relationship with service provider R1 so that subscribers of service provider H1, such as S1 and S2, can use service provider R1's network, for a fee paid by service provider H1 to service provider R1.

Service provider H1 may also have a relationship with service provider R2 so that subscribers of service provider H1 can use service provider R2's network, for a fee paid by service provider H1 to service provider R2. However, the fees paid to R2 may be more than the fees paid to R1. In that case, H1 may prefer that H1's subscribers, such as S1 and S2, use R1's network instead of R2's network, if possible. Of course, if possible, H1 prefers that subscribers, such as S1 and S2, use H1's network. The level, or order, of preference of networks is stored in the PRL.

Continuing the description of network preferences, service provider H1 might have a digital network and an analog network. H1 might prefer that subscribers use H1's digital network instead of H1's analog network whenever possible. As another example, H1 might not have any relationship with service provider N. Thus, H1's subscribers, such as S1 and S2, might not be allowed to place calls on network N. If network N is the only network available, then subscriber S1's device, say D1, and subscriber S2's device, say D2, may indicate that no service is available. Of course, in the case of calls placed to an emergency response service, H1's subscribers would be allowed to use network N.

Given the above examples, H1's digital network would be referred to as the most preferred network. N's network would not be allowed. The other networks would fall between the extremes of most preferred and not allowed. For example, R2's network might be the least preferred network, aside from the not allowed network N. H1's analog network might be more preferred than R2's network, but less preferred than R1's network. R1's network might be more preferred than H1's analog network but less preferred than H1's digital network.

The above arrangement of networks and preference relationships is actually a simple example. In reality, more networks are involved, and the PRL is complicated by several other factors as well. One such factor is geography. The PRL stores geographic information, known as "geo information", or simply "geo". The geo information can be used to select networks in certain geographic areas.

Another complicating factor has been mentioned briefly above, that is, analog versus digital operation. Systems can be either analog or digital communication systems. The PRL contains the indicators of whether a system is analog or digital. As described above with reference to PTT presence messages, some applications require digital systems, whereas some applications (such as many voice calls) can be on digital or analog systems.

If a device, such as D1 or D2 has acquired a system other than the most preferred system, known as a less preferred system or network, for its given geographic area, then the device is said to be roaming. When a device is roaming, it will scan for the most preferred system periodically, typically based on a scan timer. For example, if the device D1 has acquired a signal in network R1, then device D1 may scan for network H1 every 180 seconds. Or, for example, if the device D1 has acquired a signal in network R2, then device D1 may scan for both networks H1 and R1 every 180 seconds. The rescan time period can be any convenient time period, whether 180 seconds or not.

When a device has acquired a signal in a network, the device is said to be on, or in, that network, which can be called the present network. For convenience, when a device is on any network other than a most preferred network, it builds a scan list, as described above with respect to FIG. 5. The scan list is a subset of the PRL. The scan list includes all networks in the PRL that are more preferred than the present network and are in the same geographic area as the present network. When the scan timer expires, the device scans the scan list, which is faster than scanning the entire PRL.

However, scanning the scan list consumes resources in several ways. While the device is scanning for a more preferred network, it cannot receive or send communication on the present network. The result may include one or more of the following: (1) dropped pages; (2) missed voice calls; (3) missed SMS calls; (4) wasted network resources; and (5) battery life consumption resulting in talk time reduction or standby time reduction or both.

Scanning the scan list may take about one to five seconds. Typically, a scan list may include about one to five more preferred systems in the same geographical region. Typically, a wireless communication device might take about one second to scan for one system. Of course, these typical time estimates will change as scanning technology changes and as the number of systems increases or decreases. During the rescan the device is not available for communication. Thus, calls can be missed, among other things. This is aggravating to the user, such as S1 and S2, and results in lost revenue to the service provider.

SUMMARY OF THE INVENTION

In order to avoid the problems associated with rescanning as a result of terminating a digital call placed while in a digital only mode, a wireless communication device that is on a network other than a most preferred network is prevented from scanning for a more preferred network in response to exiting digital only mode. As a result, the wireless communication device stays locked onto the current system longer if the current system is a less preferred system.

The advantages may include: less dropped pages while scanning, resulting in fewer dropped calls and fewer dropped SMS messages, resulting in increased revenue and less frustration of the end user; and less power consumed, resulting in longer talk times and longer standby times, again resulting in increased revenue and less frustration of the end user.

Other aspects, advantages, and novel features of the invention will become apparent from the following Detailed Description, when considered in conjunction with the accompanying drawings.

BRIEF DESCRIPTION OF THE DRAWINGS

Preferred embodiments of the present invention taught herein are illustrated by way of example, and not by way of limitation, in the figures of the accompanying drawings, in which:

FIGS. 1 and 2 show flow diagrams illustrating methods for processing a digital only call origination request.

FIG. 4 shows a block diagram illustrating a wireless communication system including a PTT server for maintaining presence information.

DETAILED DESCRIPTION

Figure 3:
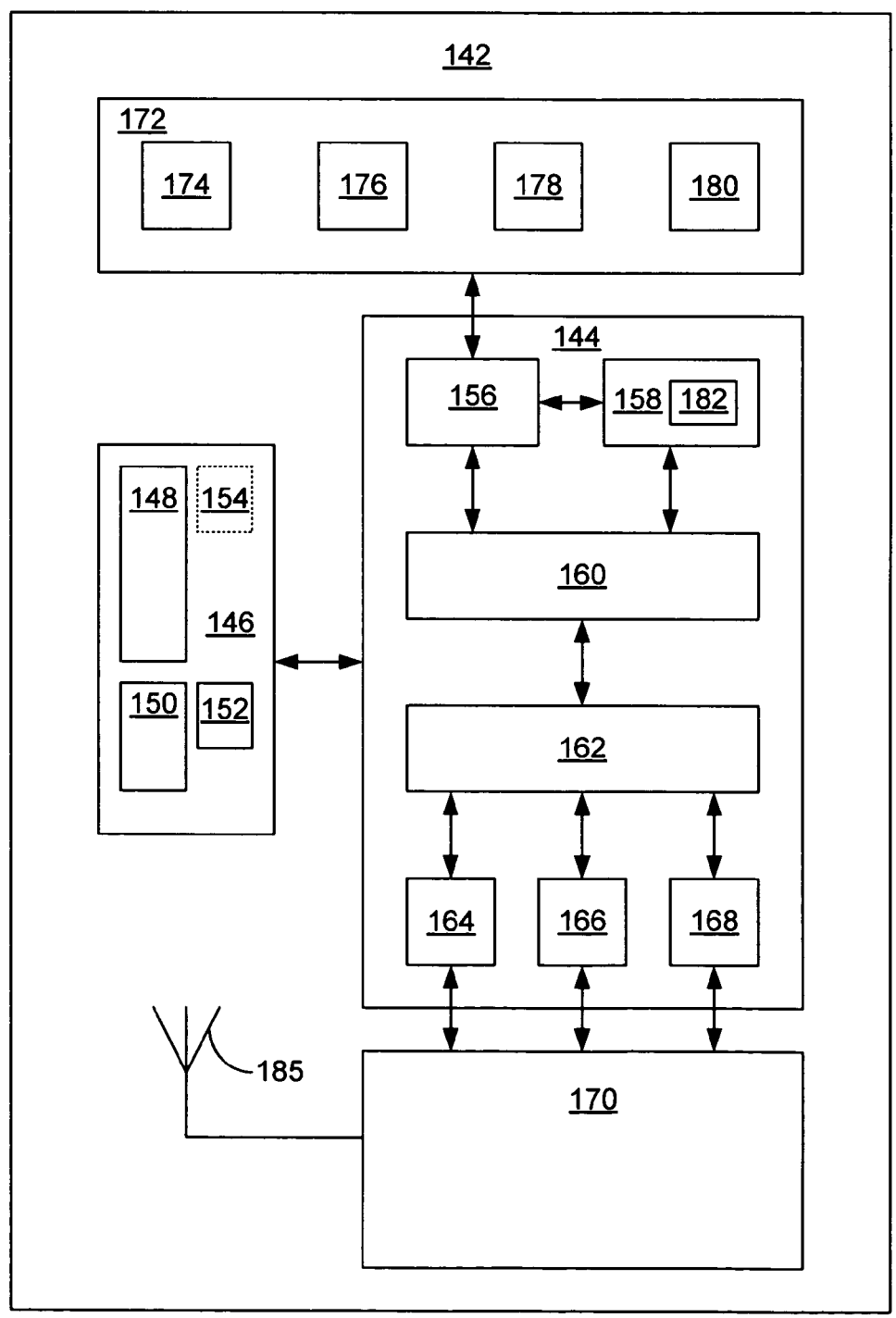
FIG. 3 shows a block diagram illustrating a wireless communication device configured to process a digital only call origination request.
Figure 5:
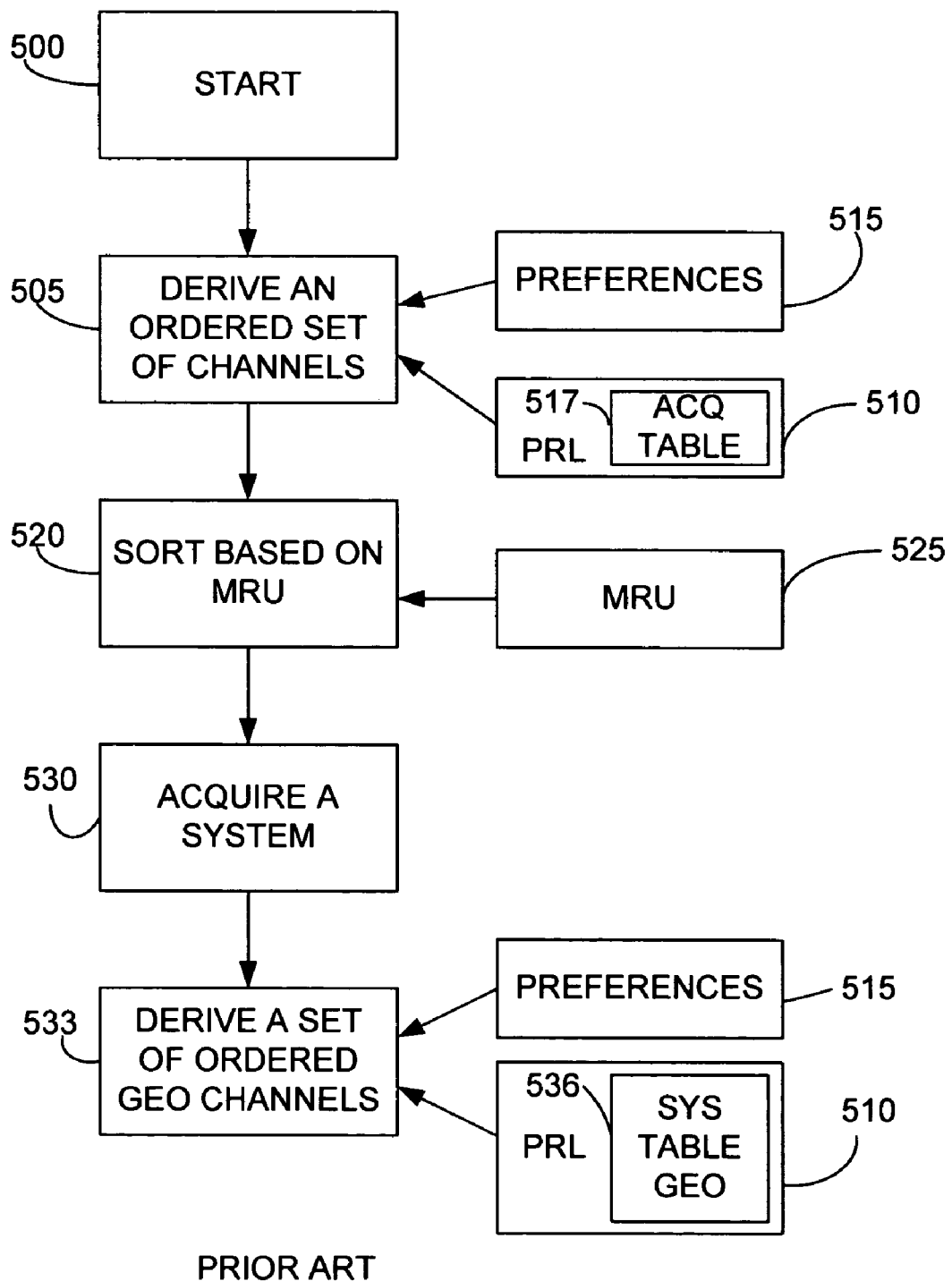
FIG. 5 shows a flow diagram illustrating a prior art algorithm relating to system acquisition.

FIG. 1 shows a flow diagram illustrating a method for processing a digital only call origination request, or command. In step 100, a less preferred digital channel is acquired. The less preferred channel is a channel in any system in the same geo region other than a most preferred channel as defined by the PRL. The terms desirable and preferred can be used interchangeably.

In step 105 a digital only origination request, or command, is received. For example, the digital only origination request might be generated as a result of a menu selection by a wireless communication device user in a software application on the wireless communication device. For example, the menu selection might be a presence change in a PTT network. The digital only origination request might be for the purpose of sending a presence message. Alternatively, the digital only origination request might be from the network, in order to send a presence message relating to the PTT presence of another PTT device. The software application and presence message will be described further below, with respect to FIGS. 3 and 4. Other examples are possible. For example, the digital only origination request might be for the purpose of sending an SMS message.

The network may be a U.S. CDMA network. In that case, any service option (SO) 33 call origination request, such as, for example, in an IS-95B or CDMA2000 system, would generate a digital only call origination command. In other networks, such as, for example, Global System for Mobile Communications (GSM) and wideband CDMA, analogous protocols to SO 33 are available, that would generate a digital only origination command. Indeed, any convenient method of generating a digital only request, or command, may be used.

In step 110, a mode is forced to digital only. Some wireless communication devices are capable of communicating in analog and digital communications. Such devices are called dual mode devices. Dual mode devises may be capable of communicating in more than two communication standards. Such devices are commonly called tri-mode or quad-mode or higher mode devices. However, such devices will be referred to herein as dual mode devices, since the relevant functionality is just that the device can communicate in analog and digital modes. When the mode is forced to digital, the device is limited to communicating in digital mode, and excluded from communicating in analog mode. More specifically, the device is limited to acquiring digital communication systems, and is restricted from acquiring analog communication systems. The limiting to digital and restricting from analog is typically performed using a PRL, as will be described further below, with respect to FIG. 3.

In step 115 a digital call is released. The digital call may be completed or it may never have successfully connected. In other words, typically, in response to the digital only request, the wireless communication device will attempt to connect a digital call. The call may be connected or it may not be successfully connected. Also, the call may be connected but then dropped due to a weakened signal strength or other similar reason. Regardless of whether the call is completed, dropped, never connected or handled any other way, eventually the call is released, as stated in step 115.

In step 120 the mode is unforced from digital only. This means that analog communications are allowed again. Typically, the wireless communication device returns to normal mode at this point. In normal mode, analog and digital communication systems can be acquired. The change to normal mode typically includes using a PRL to include analog as well as digital communication systems in a scan list, as will be described more fully below, with respect to FIG. 3.

In step 125 there is no scanning for a more preferred channel. Specifically, the device avoids scanning for a more preferred communication system as a result of unforcing the mode from digital only. The device stays locked onto the current system. Advantageously, this avoids consuming network and power source resources as described above. When scanning for a more preferred network, a wireless communication device may miss pages for incoming short message service (SMS) messages and for incoming calls, among other things. By not scanning, the wireless communication device receives a higher percentage of pages sent to the wireless communication devices.

FIG. 2 will now be described, specifically illustrating one method for not scanning for more preferred systems in response to terminating a digital only call. FIG. 2 shows a flow diagram illustrating a method for processing a digital only call origination request, or command, similar to the method illustrated with respect to FIG. 1. Step 100, 105 and 115 shown with respect to FIG. 2 are similar to steps 100, 105 and 115 shown with respect to FIG. 2, so steps 100, 105 and 115 will not be described further here.

In step 130 a re-scan timer is started. The rescan timer has a predetermined time period. The timer counts for the predetermined time period and then is expired at the end of the predetermined time period. Typically, the re-scan timer is used to determine when a wireless communication device should scan for a more preferred network when the device has acquired a less preferred network. The predetermined time period may be 180 seconds, or any convenient time period.

In step 115, a digital call is terminated, as described above with respect to FIG. 1. In query 135, it is determined whether the re-scan timer is expired. If the rescan timer is not expired, advantageously, the wireless communication device continues to wait, and does not scan for a more preferred system, as shown by the "NO" path from query 135. If the re-scan timer is expired, as shown by the "YES" path from query 135, then a scan for a more preferred system is performed, as shown in step 140. The scan for a more preferred system may occur 180 seconds after the start of the re-scan timer, rather than immediately upon termination of the digital call. This results in less scanning for more preferred channels. This results in at least one of fewer missed pages and less power consumption.

Several aspects of the methods illustrated with respect to FIGS. 1 and 2 will now be described with respect to FIG. 3. FIG. 3 shows a block diagram illustrating wireless communication device 142 configured to process a digital only call origination request, or command.

Processor 144 is connected to memory 146. Processor 144 coordinates the function of wireless communication device 142 and processes the data and commands given to the device, including processing call origination requests. Preferred roaming list (PRL) 148 is stored in memory 146. As described above, PRL 148 stores system information, network information, roam information, home information and geographic information for the various communication systems that wireless communication device 142 can communicate in. Further, PRL 148 stores channel information that may be necessary for communicating on the various channels of the various communication systems.

Memory 146 also contains scan list 150. Scan list 150 contains a list of more preferred communication networks than the present communication network, if there are any. Scan list 150 is built whenever wireless communication device 142 acquires a less preferred communication network. Thus, if wireless communication device 142 has acquired a most preferred network, then there may be no need for a scan list 150.

Memory 146 also contains digital only scan list 152. Digital only scan list 152 contains a list of more preferred networks. Digital only scan list 152 is built when wireless communication device 142 has acquired a less preferred network and receives a digital only call origination request, or command. Typically, digital only scan list 152 is built when wireless communication device 142 is forced into digital only mode. Scan list 150 may be deleted or overwritten in response to building digital only scan list 152. Alternatively, scan list 150 may reside in memory along with digital only scan list 152. Both scan list 150 and digital only scan list 152 are shown with respect to FIG. 3. However, it is possible that only one of scan list 150 and digital only scan list 152 could exist at any one time in memory 146. Indeed, it is possible that neither scan list 150 nor digital only scan list 152 could be present in memory 146 at some times, such as, for example, when wireless communication device 142 has acquired a most preferred communication network.

Memory 146 also optionally contains most recently used list 154. Most recently used list 154 stores a list of communication channels most recently used. Most recently used list 154 may be used to place the entries in scan list 150 or digital scan list 152 in a helpful order so that most recently used channels will be scanned before channels not recently used.

Memory 146 may be implemented as one or more memory devices. Further, memory 146 may be implemented in part inside processor 144. Specifically, processor 144 may have an internal memory (not shown). Any of the lists 148, 150, 152 and 154 may be contained in a memory internal to processor 144. The lists may be written to the internal memory at different times.

Processor 144 runs several software modules 156, 158, 160, 162, 164, 166 and 168. The software modules may be stored in memory, but they are shown in processor 144 because when the software modules are run, they are run on processor 144. There may be more or fewer software modules than shown with respect to FIG. 3. The software is shown as specific modules to show functionality, rather than to limit the scope or design of the software.

Starting at the lowest level of the software, receive module 164 is connected to transceiver 170 and controls the receive functions of transceiver 170. Transmit module 166 is also connected to transceiver 170 and controls the transmit functions of transceiver 170. Searcher module 168 is also connected to transceiver 170 and controls the searching functions of transceiver 170. Specifically, searcher module 168 controls transceiver 170 when device 142 is searching for a communication channel.

Each of receive module 164, transmit module 166 and searcher module 168 is connected to main control task 162. Main control task 162 controls each of the modules 164, 166 and 168. Main control task 162 determines when each of modules 164, 166, and 168 should be activated, and for example, sets the communication channels to be used by receive module 164 and transmit module 166 and to be searched by searcher module 168.

For example, main control task 162 uses the scan list 150 or digital scan list 152 to tell searcher module 168 what communication channels to search for when scanning for a more preferred communication system, responsive to the expiration of the re-scan timer. Advantageously, main control task 162 can keep receive module 164 and transmit module 166 active longer, instead of using searcher module 168 to scan for a more preferred channel, responsive to a digital call release. For example, receive module 164 may cause transceiver 170 to continue receiving the pilot signal of the less preferred channel on which the digital call was initiated. Also receive module 164 may cause transceiver 170 to continue listen for pages on the less preferred channel.

Main control task 162 is controlled to some extent by call manager 160. That is, call manager 160 requests services and functions. Main control task 162 responds by providing the requested services and functions. Call manager 160 manages the functions related to processing wireless communications to and from device 142. Call manager 160 interfaces with user interface (UI) module 156.

UI module 156 controls and responds to the various user interface devices 172, 174, 176, 178 and 180. Many UI devices are possible, such as, for example, keypad 174, display 176, speaker 178, microphone 180, and other UI devices (represented by general UI device 172). For example, UI module may control display device 176 to cause display device 176 to display menu options for selection by a user of device 142. User may select an option on the menu by pressing a key (not shown) on keypad 174.

Call manager 160 also interfaces with application 158. Application 158 may be a PTT software application for managing PTT calls. Other applications are possible. Application 158 generates a digital only call origination request, or command 182. Digital only call origination request, or command 182 may be a request to send a presence message, as described above with respect to FIGS. 1 and 2. For example, a user of device 142 may wish to change his or her PTT presence information. The user may select an option to change his or her presence information using one or more of UI devices 172, 174, 176, 178 and 180. Application 158 may or may not treat the digital only call origination request as a digital only call origination request. Regardless of whether application 158 knows the request is a digital only call origination request, call manager 160 knows and treats the request as a digital only call origination request.

Responsive to digital only call origination request 182, call manager 160 forces main control task 162 into digital only mode. At least if device 142 has acquired a less preferred communication channel, main control task 162 will cause digital only scan list 152 to be built. Then, main control task 162 will attempt to complete the call that is requested by digital only call origination request 182. Upon completion of the call, main control task 162 will not cause searcher 168 to scan digital only scan list 152. Additionally, in some types of call failures, main control task 162 may similarly avoid causing searcher 168 to scan digital only scan list 152.

Specifically, in cases of call completion and possibly in some types of call failures, main control task 162 will cause receive module 164 or transmit module 166 or both to remain active even after release of the digital call. Main control task 162 will wait until expiration of re-scan timer (described with respect to FIG. 2) to scan either digital only scan list 152 or scan list 150. Main control task 162 may cause scan list 150 to be re-built when the call fails or is completed. But even if scan list 150 is rebuilt, scan list 150 may not be scanned until expiration of re-scan timer (described with respect to FIG. 2).

Main control task 162 may control the building of scan list 150 and digital only scan list 152 based on PRL 148 and optionally most recently used list 154, or there may be another software module, called system determination module (not shown) to control the use of lists 148, 150, 152 and 154 as described above. As stated above, there may be more or fewer modules than described here.

Cellular communication devices, such as, for example, cellular telephones, typically have several modes that they can enter. Commonly, these modes are modes of main control task 162, and call manager 160 controls which mode main control task 162 (and thereby, device 142) is in. Typical modes include analog only mode, digital only mode, and home only mode. Additionally, in the U.S., cellular only mode and PCS only modes are common.

The modes refer to the following limitations. Cellular only mode refers to restricting the device 142 to using communication networks in the U.S. cellular communication band between 824 megahertz (MHz) and 894 MHz. PCS only mode refers to restricting the device 142 to using communication networks in the U.S. personal communication system (PCS) communication band between 1910 MHz and 1995 MHz.

Other similar modes are possible for the communication bands in other countries. Home only mode refers to restricting the device 142 to communications in certain systems. The PRL contains a roam indicator identifying whether each system is a home system or a roaming system. For example, The home system may or may not correspond to certain geographic area, which may be represented by a state, a telephone area code, connection to a certain base station or set of base stations, or other convenient geographic restriction. Digital only mode and analog only mode, as should be apparent from the description above, refer to restricting the device 142 to communications in digital or analog communications systems, respectively.

Entering each of the modes described above includes creating a new scan list similar to scan list 150. This can also be known as re-building the scan list. For example, when entering digital only mode, device 142 builds digital only scan list 152, as described above.

Alternatively to manipulating digital only scan list 152 and not scanning responsive to a release of the digital only call, a new mode is created for main control task 162, or for device 142. In the new mode, called service protocol mode, the main control task (optionally by means of system determination module (not shown)) builds digital only scan list 152 and then proceeds to connect the digital call. After the digital only call is complete, the main control task returns to whatever mode it was in, but it does not scan for more preferred channels, even if it is on a less preferred channel.

Protocol service mode includes one or more of the following parameters: (1) duration of time to stay on the present channel; (2) number of re-attempts to transmit the message, in case of transmission failure; (3) a waiting time, to delay re-entering back into the mode previous to service protocol mode; (4) band class and mode restrictions; and (5) a yes/no indicator, indicating whether to force to digital only or not. An advantage of parameter (3), the waiting time, is that a service provider or operator of the PTT system, such as PTT server 196 (shown and described below with respect to FIG. 4), may want to keep device 142 in service protocol mode for a certain period of time while any acknowledgement messages or other protocol messages are exchanged between device 142 and server 196, or between server 196 and the other devices described below, but not shown, with respect to FIG. 4.

Referring again to FIG. 3, transceiver 170 is connected to antenna 185. Antenna 185 transmits radio frequency (RF) communication signals over the air and receives RF signals from the air. A portable power supply (not shown), such as a battery, is also connected to processor 144 and transceiver 170 for supplying power to processor 144 and transceiver 170.

FIG. 4 shows a block diagram illustrating wireless communication system 190 including PTT server 193 for maintaining PTT presence information 196. Wireless communication device 142 communicates wirelessly with base station 199. Base station 199 is connected to the internet 202, shown as internet cloud 202. On internet 202, PTT server 193 provides PTT services for PTT devices, such as as device 142 and others (not shown). Server 193 may be operated by the same company or entity that operates the base stations providing the wireless communication service for device 142, or server 193 may be operated by a third party.

When the user of device 142 selects to change his or her PTT presence information as described with respect to FIGS. 1-3, a PTT presence message 182 (shown with respect to FIG. 3) is generated and sent over the air to base station 199. The message 182 is then transmitted to server 193 and server 193 makes appropriate changes to presence information 196. For example, presence information 196 might indicate that device 142 is unavailable for PTT calls.

After device 142 sends presence message 182 to PTT server 193, PTT server 193 sends a presence update message to device 142, indicating that the presence information stored at server 193 has been updated for device 142. This presence update message (and other protocol related messages) may be missed by device 142 if device 142 is busy scanning for a more preferred system.

As another example, presence information 196 might specify one or more other PTT users to which device 142 should be available. Alternatively, PTT server 193 might maintain a list of other PTT users that want to know when device 142 is available. In either case, PTT server 193 would send messages (not shown) to the other users (not shown) indicating that device 142 is available for PTT calls. The list of other users might include, for example, twenty other users. Thus, twenty presence messages would be sent to the other users in response to PTT presence message 182 generated at device 142 and received at server 193. Digital only calls are originated by server 193 to send the messages to the other users.

Accordingly, a high volume of digital only calls can be generated by one user, of device 142, for example, selecting to change his or her PTT presence information. After these calls are terminated, it is advantageous to avoid scanning for a more preferred system if the other users' devices are on a less preferred system.

Further, while embodiments and implementations of the invention have been shown and described, it should be apparent that many more embodiments and implementations are within the scope of the invention. Accordingly, the invention is not to be restricted, except in light of the claims and their equivalents.

What is claimed is:

1. A method for staying tuned to a less preferred communications system in a cellular communications device, the method comprising:

transmitting one or more digital messages over an air interface intended for a first communications system by the cellular communications device, a digital call comprising the one or more digital messages;

releasing the digital call; and continuing to be receptive to the first communications system after releasing the digital call while having an indicator that a second communications system is preferred over the first communications system;

starting a re-scan timer in response to releasing the digital call;

determining whether the re-scan timer indicates that a time period has expired after releasing the digital call;

waiting after releasing the digital call, if the time period has not expired; and scanning for the second communication system after releasing the digital call, if the time period has expired, the time period being significantly longer than an amount of time needed to do one scan for the second communications system.

2. The method of claim 1, further comprising receiving a digital only call origination command.

3. The method of claim 2, further comprising originating the digital call on the first communication system, responsive to the call origination command.

4. The method of claim 3, further comprising:
rebuilding a scan list, including only digital systems in the scan list.

5. The method of claim 4, wherein rebuilding the scan list comprises writing a list of digital systems to a memory storage area.

6. The method of claim 3, further comprising:
setting an indicator to ignore an analog system entry in the scan list; and
unsetting the indicator, responsive to terminating the digital call.

7. The method of claim 1, wherein releasing the digital call comprises noticing that the digital call has been dropped.

8. A computer readable medium embodying instructions for performing a method for staying tuned to a less preferred communications system in a cellular communications device, the method comprising the steps of:
transmitting one or more digital messages using an air interface intended for a first communications system by the cellular communications device, a digital call comprising the one or more digital messages;
releasing the digital call;
continuing to be receptive to the first communications system after releasing the digital call while having an indicator that a second communications system is preferred over the first communications system;
starting a re-scan timer in response to releasing the digital call;
determining whether the re-scan timer indicates that a time period has expired after releasing the digital call;
waiting after releasing the digital call, if the time period has not expired; and
scanning for the second communication system after releasing the digital call if the time period has expired.

9. The computer readable medium of claim 8, the method further comprising:
receiving a digital only call origination command.

10. The computer readable medium of claim 9, the method further comprising:
originating the digital call on the first communication system, responsive to the call origination command.

11. The computer readable medium of claim 10, the method further comprising:
rebuilding a scan list, including only digital systems in the scan list.

12. The computer readable medium of claim 11, wherein the rebuilding a scan list comprises writing a list of digital systems to a memory storage area.

13. The computer readable medium of claim 11, the method further comprising:
setting an indicator to ignore an analog system entry in the scan list; and
unsetting the indicator, responsive to terminating the digital call.

14. The computer readable medium of claim 8 wherein releasing the digital call comprises noticing that the digital call has been dropped.

15. A wireless communication device comprising:
an antenna for receiving wireless communication signals over the air; a transceiver coupled to the antenna;
a memory;
a clock; and
a processor connected to the transceiver, the memory and the clock, the processor configured to perform a method comprising:
transmitting at least one digital messages using an air interface intended for a first communications system, a digital call comprising the at least one digital message;
generating a scan list in the memory indicating that at least one communications system is more preferred than the first communications system based on at least one factor;
releasing the digital call;
starting a re-scan timer in response to releasing the digital call;
determining whether the re-scan timer indicates that a time period has expired after releasing the digital call;
waiting after releasing the digital call, if the time period has not expired; and
scanning for the more preferred communications system using the generated scan list, responsive to the termination of the time period.

16. The wireless communication device of claim 15, further comprising:
a push to talk client residing in the processor, the push to talk client configured to originate the digital call.

17. The wireless communication device of claim 16, wherein the push to talk client is configured to generate a digital call origination command responsive to a push to talk presence change of the wireless communication device.

18. A method for staying tuned to a less preferred communications system in a cellular communications device, the method comprising:
deriving a scan list from a preferred roaming list, the scan list including a second communications system that is preferred over the first communications system because of a geographic characteristic associated with the second communications system;
releasing a digital call; and
continuing to be receptive to the first communications system after releasing the digital call while having access to the scan list;
starting a re-scan timer in response to releasing the digital call;
determining whether the re-scan timer indicates that a time period has expired after releasing the digital call;
waiting after releasing the digital call, if the time period has not expired; and
scanning for the second communication system after releasing the digital call, if the time period has expired, the time period being significantly longer than an amount of time needed to do one scan for the second communications system.

* * * * *